US009862867B2

(12) United States Patent
Gordon et al.

(10) Patent No.: US 9,862,867 B2
(45) Date of Patent: Jan. 9, 2018

(54) ALKOXY-FUNCTIONAL ORGANOPOLYSILOXANE RESIN AND POLYMER AND RELATED METHODS FOR FORMING SAME

(71) Applicant: Dow Corning Corporation, Midland, MI (US)

(72) Inventors: Glenn Gordon, Midland, MI (US); Kristen Steinbrecher, Midland, MI (US); James Tonge, Sanford, MI (US); Afrooz Zarisfi, Midland, MI (US)

(73) Assignee: DOW CORNING CORPORATION, Midland, MI (US)

( * ) Notice: Subject to any disclaimer, the term of this patent is extended or adjusted under 35 U.S.C. 154(b) by 0 days.

(21) Appl. No.: 14/766,771

(22) PCT Filed: Feb. 10, 2014

(86) PCT No.: PCT/US2014/015619
§ 371 (c)(1),
(2) Date: Aug. 10, 2015

(87) PCT Pub. No.: WO2014/124388
PCT Pub. Date: Aug. 14, 2014

(65) Prior Publication Data
US 2016/0002513 A1 Jan. 7, 2016

Related U.S. Application Data

(60) Provisional application No. 61/763,129, filed on Feb. 11, 2013.

(51) Int. Cl.
*C08G 77/08* (2006.01)
*C09J 183/06* (2006.01)
*C09J 183/04* (2006.01)
*C08L 83/04* (2006.01)
*C08G 77/06* (2006.01)
*C08G 77/50* (2006.01)
*C08G 77/12* (2006.01)
*C08G 77/18* (2006.01)
*C08G 77/20* (2006.01)

(52) U.S. Cl.
CPC ............. *C09J 183/06* (2013.01); *C08L 83/04* (2013.01); *C09J 183/04* (2013.01); *C08G 77/06* (2013.01); *C08G 77/12* (2013.01); *C08G 77/18* (2013.01); *C08G 77/20* (2013.01); *C08G 77/50* (2013.01)

(58) Field of Classification Search
CPC ......... C08L 83/04; C08G 77/50; C08G 77/18; C08G 77/06; C09J 183/06; C09J 183/04
See application file for complete search history.

(56) References Cited

U.S. PATENT DOCUMENTS

| 2,676,182 A | 4/1954 | Daudt et al. |
| 3,159,601 A | 12/1964 | Ashby |
| 3,220,972 A | 11/1965 | Lamoreaux |
| 3,296,291 A | 1/1967 | Chalk et al. |
| 3,337,510 A | 8/1967 | Klebe |
| 3,419,593 A | 12/1968 | Willing |
| 3,516,946 A | 6/1970 | Modic |
| 3,714,109 A | 1/1973 | Matherly et al. |
| 3,814,730 A | 6/1974 | Karstedt |
| 3,989,668 A | 11/1976 | Lee et al. |
| 4,057,596 A * | 11/1977 | Takamizawa ........... C08L 83/04 427/387 |
| 4,087,585 A | 5/1978 | Schults |
| 4,143,088 A | 3/1979 | Farve et al. |
| 4,279,717 A | 7/1981 | Eckberg et al. |
| 4,322,844 A | 3/1982 | Fellinger et al. |
| 4,348,454 A | 9/1982 | Eckberg |
| 4,611,042 A | 9/1986 | Rivers-Farrell et al. |
| 4,681,963 A | 7/1987 | Lewis |
| 4,705,765 A | 11/1987 | Lewis |
| 4,711,928 A * | 12/1987 | Lee ........................ C08G 77/50 524/860 |
| 4,726,964 A | 2/1988 | Isobe et al. |

(Continued)

FOREIGN PATENT DOCUMENTS

| EP | 0347895 B | 12/1989 |
| GB | 1101167 | 1/1968 |
| JP | 201184600 | 4/2001 |
| WO | 1998040425 A1 | 9/1998 |
| WO | 2004013403 | 2/2004 |
| WO | 2004037941 A2 | 5/2004 |
| WO | 2011056832 A1 | 5/2011 |
| WO | 2014124362 A1 | 8/2014 |
| WO | 2014124364 A1 | 8/2014 |
| WO | 2014124367 A1 | 8/2014 |
| WO | 2014124378 A1 | 8/2014 |
| WO | 2014124382 A1 | 8/2014 |
| WO | 2014124389 A1 | 8/2014 |

OTHER PUBLICATIONS

PCT/US2014/015619 ISR dated Apr. 8, 2014.
JP201184600A, published Apr. 28, 2011, machine translation.

*Primary Examiner* — Margaret Moore
(74) *Attorney, Agent, or Firm* — Matthew T. Fewkes

(57) ABSTRACT

An alkoxy-functional organopolysiloxane resin and polymer is disclosed that comprises the reaction product of a reaction of (i) an alkenyl-functional siloxane resin comprising $R_3SiO_{1/2}$ units and $SiO_{4/2}$ units; (ii) an alkoxysilane-functional organosiloxane compound having at least one silicon-bonded hydrogen atom at a molecular terminal; (iii) an endcapper according to the formula to the formula $R^2{}_3Si—(R^2{}_2SiO)_s—SiR^2{}_2H$ or $R^2{}_3Si—(R^2{}_2SiO)_t—(HR^2SiO)—SiR^2{}_3$, or combinations thereof; and (iv) a polyorganosiloxane having an average, per molecule, of at least 2 aliphatically unsaturated organic groups in the presence of a (v) hydrosilylation catalyst. In this alkoxy-functional organopolysiloxane resin and polymer, each $R^2$ is independently a hydrocarbon radical and the subscripts s and t independently have values ranging from 0 to 10.

18 Claims, No Drawings

(56) References Cited

U.S. PATENT DOCUMENTS

| | | |
|---|---|---|
| 4,737,562 A | 4/1988 | Chaudhury et al. |
| 4,742,103 A | 5/1988 | Morita et al. |
| 4,753,977 A | 6/1988 | Merrill |
| 4,766,176 A | 8/1988 | Lee et al. |
| 4,766,183 A | 8/1988 | Rizk et al. |
| 4,774,310 A | 9/1988 | Butler |
| 4,784,879 A | 11/1988 | Lee et al. |
| 4,962,076 A | 10/1990 | Chu et al. |
| 4,987,158 A | 1/1991 | Eckberg |
| 5,017,654 A | 5/1991 | Togashi et al. |
| 5,034,491 A | 7/1991 | Wewers et al. |
| 5,036,117 A | 7/1991 | Chung et al. |
| 5,051,455 A | 9/1991 | Chu et al. |
| 5,053,422 A | 10/1991 | Pinza et al. |
| 5,053,442 A | 10/1991 | Chu et al. |
| 5,057,476 A | 10/1991 | Saruyama et al. |
| 5,075,038 A | 12/1991 | Cole et al. |
| 5,175,325 A | 12/1992 | Brown et al. |
| 5,194,649 A | 3/1993 | Okawa |
| 5,198,476 A | 3/1993 | Kobayashi et al. |
| 5,200,543 A | 4/1993 | Inomata et al. |
| 5,248,715 A | 9/1993 | Gray et al. |
| 5,254,645 A | 10/1993 | King et al. |
| 5,298,589 A | 3/1994 | Buese et al. |
| 5,364,921 A | 11/1994 | Gray et al. |
| 5,397,813 A | 3/1995 | Eckberg et al. |
| 5,412,055 A | 5/1995 | Loo |
| 5,459,206 A | 10/1995 | Somemiya et al. |
| 5,473,026 A | 12/1995 | Strong et al. |
| 5,525,696 A | 6/1996 | Herzig et al. |
| 5,536,803 A | 7/1996 | Fujiki et al. |
| 5,545,831 A | 8/1996 | Kaiya et al. |
| 5,567,883 A | 10/1996 | Nara |
| 5,580,925 A | 12/1996 | Iwahara et al. |
| 5,691,435 A | 11/1997 | Herzig et al. |
| 5,696,209 A * | 12/1997 | King .................. C08F 299/08 525/477 |
| 5,736,619 A | 4/1998 | Kane et al. |
| 5,744,507 A | 4/1998 | Angell et al. |
| 5,869,726 A | 2/1999 | Dauth et al. |
| 5,985,371 A * | 11/1999 | Fujioka ................ C09D 183/04 427/387 |
| 5,985,462 A | 11/1999 | Herzig et al. |
| 6,013,701 A | 1/2000 | Kunimatsu et al. |
| 6,030,919 A | 2/2000 | Lewis |
| 6,093,782 A | 7/2000 | Herzig et al. |
| 6,127,502 A | 10/2000 | Krahnke et al. |
| 6,160,150 A | 12/2000 | Krahnke et al. |
| 6,169,142 B1 | 1/2001 | Nakano et al. |
| 6,252,100 B1 | 6/2001 | Herzig |
| 6,297,340 B1 | 10/2001 | Tachikawa |
| 6,303,729 B1 | 10/2001 | Sato |
| 6,313,255 B1 | 11/2001 | Rubinsztajn |
| 6,349,312 B1 | 2/2002 | Fresko et al. |
| 6,420,504 B1 | 7/2002 | Yoshitake et al. |
| 6,777,512 B1 | 8/2004 | Sonnenschein et al. |
| 6,806,330 B1 | 10/2004 | Sonnenschein et al. |
| 7,026,399 B2 | 4/2006 | Kim et al. |
| 7,253,307 B1 | 8/2007 | Carlson, Jr. et al. |
| 7,378,482 B2 | 5/2008 | Asch et al. |
| 7,429,636 B2 | 9/2008 | Asch et al. |
| 7,432,338 B2 | 10/2008 | Chapman et al. |
| 7,440,536 B2 | 10/2008 | Bruder et al. |
| 7,449,536 B2 | 11/2008 | Chapman et al. |
| 7,687,585 B2 | 3/2010 | Karthauser |
| 7,700,712 B2 | 4/2010 | Zech et al. |
| 7,850,870 B2 | 12/2010 | Ahn et al. |
| 7,906,605 B2 | 3/2011 | Cray et al. |
| 7,932,319 B2 | 4/2011 | Yamamoto et al. |
| 8,110,630 B2 | 2/2012 | Lin et al. |
| 8,168,737 B2 * | 5/2012 | Alvarez .................. C08G 77/14 525/476 |
| 8,580,073 B2 | 11/2013 | Behl et al. |
| 8,618,211 B2 | 12/2013 | Bhagwagar et al. |
| 8,618,233 B2 * | 12/2013 | Alvarez .................. C08G 77/50 427/387 |
| 8,889,261 B2 | 11/2014 | Carbary et al. |
| 8,933,187 B2 * | 1/2015 | Griswold ............... C09J 183/04 528/31 |
| 9,045,647 B2 | 6/2015 | Kleyer et al. |
| 2002/0061998 A1 | 5/2002 | Cray et al. |
| 2003/0171487 A1 | 9/2003 | Ellsworth et al. |
| 2007/0289495 A1 | 12/2007 | Cray et al. |
| 2010/0092690 A1 * | 4/2010 | Alvarez .................. C08G 77/50 427/515 |
| 2010/0183525 A1 | 7/2010 | Lin |
| 2012/0245272 A1 | 9/2012 | Dent et al. |
| 2015/0361320 A1 | 12/2015 | Tang et al. |

\* cited by examiner

ALKOXY-FUNCTIONAL ORGANOPOLYSILOXANE RESIN AND POLYMER AND RELATED METHODS FOR FORMING SAME

CROSS REFERENCE TO RELATED APPLICATIONS

This application is a U.S. national stage filing under 35 U.S.C. §371 of PCT Application No. PCT/US14/15619 filed on 10 Feb. 2014, which claims the benefit of U.S. Provisional Patent Application No. 61/763,129 filed 11 Feb. 2013 under 35 U.S.C. §119 (e). PCT Application No. PCT/US14/15619 and U.S. Provisional Patent Application No. 61/763,129 are hereby incorporated by reference.

The present invention generally relates to reactive resin and polymers, and more specifically to an alkoxy-functional organopolysiloxane resin and polymer.

Polyorganosiloxane compositions that cure to elastomeric materials are well known. Such compositions may be prepared by mixing polydiorganosiloxanes having curable (e.g., hydrolyzable, radiation curable, or heat curable) groups with crosslinking agents and/or catalysts, as needed. Generally, the polydiorganosiloxanes may have 1 to 3 reactive groups per chain end. Compositions including these components can then be cured, for example, by exposure to atmospheric moisture.

Furthermore, to show utility for certain applications, such as silicone adhesive applications, a filler may be added to the polyorganosiloxane composition to improve the physical property profile (e.g., increase tensile strength and increase % elongation to break) of the resulting cured product of the composition. Other properties such as adhesion and dispensability also play a role in the performance and commercial acceptance of a composition for adhesive applications.

With respect to dispensability, resins are typically included in silicone adhesive applications to make the compositions more flowable, and thus may reduce stringing of the adhesive composition, for example, as it is dispensed through a fine tip applicator. These resins may be non-reactive in the composition (i.e., are non-reactive resins) or may reactive (i.e., are reactive resins) and react with other components of the composition, such as during the curing process.

It is an object of the present invention to provide a novel reactive resin and polymer that may be introduced to a silicone adhesive composition and provide additional benefits in terms of flowability, improved mechanical properties and cure response.

BRIEF SUMMARY OF THE INVENTION

The present invention discloses an alkoxy-functional organopolysiloxane resin and polymer that comprises the reaction product of a reaction of (i) an alkenyl-functional siloxane resin comprising $R_3SiO_{1/2}$ units and $SiO_{4/2}$ units, (ii) an alkoxysilane-functional organosiloxane compound having at least one silicon-bonded hydrogen atom at a molecular terminal; (iii) an endcapper, and (iv) a polyorganosiloxane having an average, per molecule, of at least 2 aliphatically unsaturated organic groups in the presence of a (v) hydrosilylation catalyst.

In this invention, each R of the alkenyl-functional siloxane resin is independently a monovalent hydrocarbon radical having 1 to 6 carbon atoms with the proviso that at least one R is an alkenyl radical. In addition, the molar ratio of the $R_3SiO_{1/2}$ units to $SiO_{4/2}$ units has a value ranging from 0.5/1 to 1.5/1.

The endcapper (iii) of the present invention is according to the formula $R^2_3SiO—(R^2_2SiO)_s—SiR^2_2H$ or $R^2_3SiO—(R^2_2SiO)_t—(HR^2SiO)—SiR^2_3$, or combinations thereof, wherein each $R^2$ is independently a hydrocarbon radical and wherein the subscripts s and t independently have values ranging from 0 to 10.

The alkoxy-functional organopolysiloxane resin and polymer of the present invention may be utilized in a wide variety of silicone adhesive applications. The alkoxy-functional organopolysiloxane polymer and resin aids in the dispensability of these adhesives, and also provides reactive functionality that is capable of moisture cure.

DETAILED DESCRIPTION OF THE INVENTION

The articles 'a', 'an', and 'the' each refer to one or more, unless otherwise indicated. All amounts, ratios, and percentages in this application are by weight, unless otherwise indicated. All kinematic viscosities were measured at 25° C., unless otherwise indicated.

The present invention is directed to a reactive resin and polymer that may be utilized in adhesive applications, such as silicone adhesive compositions.

In certain embodiments, the reactive resin and polymer is an alkoxy-functional organopolysiloxane resin and polymer that comprises the reaction product of a reaction of:

(i) an alkenyl-functional siloxane resin comprising $R_3SiO_{1/2}$ units and $SiO_{4/2}$ units,
 wherein each R is independently a monovalent hydrocarbon radical having 1 to 6 carbon atoms with the proviso that at least one R is an alkenyl radical,
 wherein the molar ratio of the $R_3SiO_{1/2}$ units to $SiO_{4/2}$ units has a value of from 0.5/1 to 1.5/1, (ii) an alkoxysilane-functional organosiloxane compound having at least one silicon-bonded hydrogen atom at a molecular terminal; and (iii) an endcapper according to the formula $R^2_3SiO—(R^2_2SiO)_s—SiR^2_2H$ or $R^2_3SiO—(R^2_2SiO)_t—(HR^2SiO)—SiR^2_3$, or combinations thereof, wherein each $R^2$ is independently a hydrocarbon radical and wherein the subscripts s and t have respective values ranging from 0 to 10;

(iv) a polyorganosiloxane having an average, per molecule, of at least 2 aliphatically unsaturated organic groups;
 in the presence of a (v) hydrosilylation catalyst.

The alkenyl-functional siloxane compound (i), in certain embodiments, includes a resinous portion wherein the $R_3SiO_{1/2}$ units (i.e., "M" units) are bonded to the $SiO_{4/2}$ units (i.e., "Q" units), each of which is bonded to at least one other $SiO_{4/2}$ unit. In the $R_3SiO_{1/2}$ units, as noted above, each R is individually a monovalent hydrocarbon radical having less than 6 carbon atoms, with the proviso that at least one R is an alkenyl radical. Examples of suitable R radicals include alkyl radicals, such as methyl, ethyl, propyl, and pentyl; alkenyl radicals, such as vinyl, alkyl, and 5-hexenyl; and aryl radicals such as phenyl.

At least one third, and more preferably substantially all R radicals, are methyl radicals, with the proviso that at least one R radical is an alkenyl radical, and further with the proviso that the resin (i) ranges from 0.5 to 4 weight percent, alternatively from 1.0 to 2.2 weight percent, alkenyl-functionality, based on the total weight of the resin (i). Stated differently, the alkenyl radical content of the resin (i) ranges from 0.05 to 4 weight percent of the total weight of the resin (i). Examples of preferred $R_3SiO_{1/2}$ units having methyl radicals include $Me_3SiO_{1/2}$ units and $PhMe_2SiO_{1/2}$ units, wherein Me is methyl and Ph is phenyl.

In addition, in certain embodiments, the silanol content of the resin (i) is less than 1 weight percent of the total weight of the resin (i). The term "silanol content", as defined herein, refers to the weight percent of silicon-hydroxy groups in the particular molecule in which they are included, and here defined as the total weight percent of silicon-hydroxy groups in the resin (i) (i.e., the weight percent of Si—OH groups in the resin).

For the purposes of the present invention, the ratio of $R_3SiO_{1/2}$ units to $SiO_{4/2}$ units in resin (i) has a molar ratio of 0.5:1 to 1.5:1, respectively. It is preferred that the molar ratio of the total M units to total Q units of the resin (i) be between 0.6:1 and 1.0:1. The above M/Q molar ratios can be easily obtained by $^{29}Si$ nuclear magnetic resonance (NMR) spectroscopy.

The resin (i) preferably has a weight average molecular weight $M_w$ ranging from 12,000 to 30,000 g/mole (Daltons), alternatively from 17,000 and 22,000 g/mole.

The alkoxysilane-functional organosiloxane compound having at least one silicon-bonded hydrogen atom at a molecular terminal (ii), in certain embodiments, is of the general formula $HSi(R^3)_2OSi(R^3)_2CH_2CH_2SiR^3_z(OR^3)_{3-z}$, wherein each $R^3$ is independently a monovalent hydrocarbon having 1 to 6 carbon atoms and wherein the subscript z is 0 or 1.

Alternatively, the alkoxysilane-functional organosiloxane compound having at least one silicon-bonded hydrogen atom at a molecular terminal (ii) is of the general formula $HSi(Me)_2OSi(Me)_2CH_2CH_2Si(OMe)_3$, wherein Me is methyl.

Component (iii) is an endcapper. The endcapper may be a polydiorganosiloxane having one silicon-bonded hydrogen atom per molecule. An exemplary endcapper may have the formula (I), formula (II), or a combination thereof. Formula (I) is $R^2_3SiO—(R^2_2SiO)_s—SiR^2_2H$. Each $R^2$ is as described above and is independently a monovalent hydrocarbon group exemplified by alkyl such as methyl, ethyl, propyl, butyl, pentyl, and hexyl; and aryl such as phenyl, tolyl, xylyl and benzyl; and subscripts has a value ranging from 0 to 10, alternatively 1 to 10, and alternatively 1. Formula (II) is $R^2_3SiO—(R^2_2SiO)_t—(HR^2SiO)—SiR^2_3$. In this formula, each $R^2$ is as described above and is independently a monovalent hydrocarbon group exemplified by alkyl such as methyl, ethyl, propyl, butyl, pentyl, and hexyl; and aryl such as phenyl, tolyl, xylyl and benzyl. Subscript t has a value ranging from 0 to 10, alternatively 0.

Component (iv) is a polyorganosiloxane having an average, per molecule, of at least 2 aliphatically unsaturated organic groups, which are capable of undergoing a hydrosilylation reaction with a silicon bonded hydrogen atom of component (ii). Component (iv) may have a linear or branched structure. Alternatively, component (iv) may have a linear structure. Component (iv) may be a combination comprising two or more polyorganosiloxanes that differ in at least one of the following properties: structure, viscosity, degree of polymerization, and sequence.

Component (iv) has a minimum average degree of polymerization (average DP) of 100. Alternatively, average DP of component (iv) may range from 100 to 1000. The distribution DP of polyorganosiloxanes of component (iv) can be bimodal. For example, component (iv) may comprise one alkenyl terminated polydiorganosiloxane with a DP of 60 and another alkenyl terminated polydiorganosiloxane with a DP higher than 100, provided that average DP of the polydiorganosiloxanes ranges from 100 to 1000. However, suitable polyorganosiloxanes for use in component (iv) have a minimum degree of polymerization (DP) of 10, provided that polyorganosiloxanes with DP less than 10 are combined with polyorganosiloxanes having DP greater than 100. Suitable polydiorganosiloxanes for component (iv) are known in the art and are commercially available. For example, Dow Corning® SFD-128 has DP ranging from 800 to 1000, Dow Corning® SFD-120 has DP ranging from 600 to 700, Dow Corning® 7038 has DP of 100, and Dow Corning® SFD-119 has DP of 150. All of these are vinyl-terminated polydimethylsiloxanes are commercially available from Dow Corning Corporation of Midland, Mich., USA. When component (iv) has a bimodal distribution, the polyorganosiloxane with the lower DP (low DP polyorganosiloxane) is present in a lower amount than the polyorganosiloxane with the higher DP (high DP polyorganosiloxane). For example, in a bimodal distribution, the ratio of low DP polyorganosiloxane/high DP polyorganosiloxane may range from 10/90 to 25/75.

Component (iv) is exemplified by polyorganosiloxanes of formula (I), formula (II), or a combination thereof. In certain embodiments, Formula (I) is $R^4_2R^5SiO(R^4_2SiO)_a(R^4R^5SiO)_bSiR^4_2R^5$, and formula (II) is $R^4_3SiO(R^4_2SiO)_c(R^4R^5SiO)_dSiR^4_3$, In these formulae, each $R^4$ is independently a monovalent organic group free of aliphatic unsaturation; each $R^5$ is independently an aliphatically unsaturated organic group; subscript a has an average value ranging from 2 to 1000; subscript b has an average value ranging from 0 to 1000; subscript c has an average value ranging from 0 to 1000; and subscript d has an average value ranging from 4 to 1000. In formulae (I) and (II), $10≤(a+b)≤1000$ and $10≤(c+d)≤1000$.

Suitable monovalent organic groups for $R^4$ include, but are not limited to, monovalent hydrocarbon groups exemplified by alkyl such as methyl, ethyl, propyl, butyl, pentyl, octyl, undecyl, and octadecyl; cycloalkyl such as cyclohexyl; and aryl such as phenyl, tolyl, xylyl, benzyl, and 2-phenylethyl. Each $R^5$ is independently an aliphatically unsaturated monovalent organic group. $R^5$ may be an aliphatically unsaturated monovalent hydrocarbon group exemplified by alkenyl groups such as vinyl, allyl, propenyl, and butenyl; and alkynyl groups such as ethynyl and propynyl.

Component (iv) may comprise a polydiorganosiloxane such as i) dimethylvinylsiloxy-terminated polydimethylsiloxane, ii) dimethylvinylsiloxy-terminated poly(dimethylsiloxane/methylvinylsiloxane), iii) dimethylvinylsiloxy-terminated polymethylvinylsiloxane, iv) trimethylsiloxy-terminated poly(dimethylsiloxane/methylvinylsiloxane), v) trimethylsiloxy-terminated polymethylvinylsiloxane, vi) dimethylvinylsiloxy-terminated poly(dimethylsiloxane/methylphenylsiloxane), vii) dimethylvinylsiloxy-terminated poly(dimethylsiloxane/diphenylsiloxane), viii) phenyl,methyl,vinyl-siloxy-terminated polydimethylsiloxane, ix) dimethylhexenylsiloxy-terminated polydimethylsiloxane, x) dimethylhexenylsiloxy-terminated poly(dimethylsiloxane/methylhexenylsiloxane), xi) dimethylhexenylsiloxy-terminated polymethylhexenylsiloxane, xii) trimethylsiloxy-terminated poly(dimethylsiloxane/methylhexenylsiloxane), or xiii) a combination thereof.

Component (v) is a hydrosilylation catalyst which accelerates the reaction of components (i)-(iv). Component (v) may be added in an amount sufficient to promote the reaction of components (i)-(iv), and this amount may be, for example, sufficient to provide 0.1 parts per million (ppm) to 1000 ppm of platinum group metal, alternatively 1 ppm to 500 ppm, alternatively 2 ppm to 200, alternatively 5 ppm to 20 ppm, based on the combined weight of all components used in the process.

Suitable hydrosilylation catalysts (v) are known in the art and commercially available. Component (v) may comprise a platinum group metal selected from platinum (Pt), rhodium, ruthenium, palladium, osmium or iridium metal or organometallic compound thereof, or a combination thereof. Component (v) is exemplified by compounds such as chloroplatinic acid, chloroplatinic acid hexahydrate, platinum dichloride, and complexes of said compounds with low molecular weight organopolysiloxanes or platinum compounds microencapsulated in a matrix or coreshell type structure. Complexes of platinum with low molecular weight organopolysiloxanes include 1,3-diethenyl-1,1,3,3-tetramethyldisiloxane complexes with platinum. Alternatively, the catalyst may comprise 1,3-diethenyl-1,1,3,3-tetramethyldisiloxane complex with platinum. When the catalyst is a platinum complex with a low molecular weight organopolysiloxane, the amount of catalyst may range from 0.04% to 0.4% based on the combined weight of the components used in the process.

Suitable hydrosilylation catalysts for component (v) are described in, for example, U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B.

In certain embodiments, the alkenyl content (i.e., the vinyl content) of the reactive resin and polymer, contributed from components (i) and (iv), comprises from 0.6 to 2.2 weight percent, alternatively 1.0 to 2.0 weight percent, of the total weight of the reactive resin and polymer.

In certain embodiments, the silanol content of the reactive resin and polymer, contributed from component (ii), comprises from 0.3 to 2.2 weight percent, alternatively 1.0 to 2.0 weight percent, of the total weight of the reactive resin and polymer.

In certain embodiments, the reactive resin and polymer is formulated wherein at most 60 weight % of the alkenyl radicals of the resin (i) react with the silicon-bonded hydrogen atoms of the compound (ii). In certain embodiments, the reactive resin and polymer is formulated wherein at least 40 weight % of the alkenyl radicals of the resin (i) react with the silicon-bonded hydrogen atoms of the endcapper (iii).

In addition to components (i)-(v), the reactive resin and polymer may include other optional components. Suitable additional components that may be utilized include, but are not limited to, (vi) an acid scavenger, (vii) a colorant, (viii) a resin treatment agent, (ix) a corrosion inhibitor, (x), an adhesion promoter, and combinations thereof.

Component (vi) is an acid scavenger. Suitable acid scavenger may comprise a metal oxide such as magnesium oxide. Acid scavengers are known in the art and are commercially available under tradenames including Rhenofit F, Star Mag CX-50, Star Mag CX-150, BLP-3, and MaxOx98LR. Rhenofit F was calcium oxide from Rhein Chemie Corporation of Chardon, Ohio, USA. Star Mag CX-50 was magnesium oxide from Merrand International Corp. of Portsmouth, N.H., USA. MagOX 98LR was magnesium oxide from Premier Chemicals LLC of W. Conshohocken, Pa., USA. BLP-3 was calcium carbonate was Omya Americas of Cincinnati, Ohio, USA. The amount of acid scavenger (vi) may range from 0.1% to 10% based on the total weight of the reactive resin and polymer.

Component (vii) is a colorant (e.g., dye or pigment). Examples of suitable colorants include carbon black, Stan-Tone 40SP03 Blue (which is commercially available from PolyOne) and Colorant BA 33 Iron Oxide pigment (which is commercially available from Cathay Pigments (USA), Inc. Valparaiso, Ind. 46383 USA). Examples of colorants are known in the art and are disclosed in U.S. Pat. Nos. 4,962,076; 5,051,455; and 5,053,442. The amount of colorant added to the reactive resin and polymer depends on various factors including the other components of the composition, and the type of colorant selected, however, the amount may range from 0.001% to 20% based on the total weight of the reactive resin and polymer.

Component (viii) is a resin treatment agent. Suitable resin treatment agents may be of the formula $R^6Si(OR^6)_3$ or $(R^6_3Si)_2NH$, and combinations thereof, wherein each $R^6$ is independently a monovalent hydrocarbon radical having 1 to 6 carbon atoms. When utilized, the resin treatment agent comprises less than 1% of the total weight of reactive resin and polymer.

Component (ix) is a corrosion inhibitor. Examples of suitable corrosion inhibitors include benzotriazole, mercaptabenzotriazole, mercaptobenzothiazole, and commercially available corrosion inhibitors such as 2,5-dimercapto-1,3,4-thiadiazole derivative (CUVAN® 826) and alkylthiadiazole (CUVAN® 484) from R. T. Vanderbilt. The amount of component (ix) may range from 0.05% to 5% based on the total weight of the reactive resin and polymer.

Component (x) is an adhesion promoter. Examples of suitable adhesion promoters include an alkoxysilane such as an epoxy-functional alkoxysilane, or a mercapto-functional compound; a combination of an alkoxysilane and a hydroxy-functional polyorganosiloxane; a mercapto-functional compound; an unsaturated compound; an epoxy-functional silane; an epoxy-functional siloxane; a combination, such as a reaction product, of an epoxy-functional silane or epoxy-functional siloxane and a hydroxy-functional polyorganosiloxane; or a combination thereof. Suitable adhesion promoters are known in the art and are commercially available. For example, Silquest® A186 is beta-(3,4-epoxycyclohexyl)ethyltrimethoxysilane which is commercially available from Crompton OSi Specialties of Middlebury, Conn., USA. CD9050 is a monofunctional acid ester useful as an adhesion promoter that provides adhesion to metal substrates and is designed for radiation curable compositions. CD9050 is commercially available from Sartomer Co. SR489D is tridecyl acrylate, SR395 is isodecyl acrylate, SR257 is stearyl acrylate, SR506 is isobornyl acrylate, SR833S is tricyclodecane dimethanol diacrylate, SR238 is 1,6 hexanediol diacrylate, and SR351 is trimethylol propane triacrylate, all of which are also commercially available from Sartomer Co. The amount of adhesion promoter (x) added to the reactive resin and polymer depends on various factors including the specific adhesion promoter selected, the other components of the reactive resin and polymer, and the end use of the reactive resin and polymer, however, the amount may range from 0.01% to 5% based on the total weight of the reactive resin and polymer. Other suitable adhesion promoters, which are useful to promote adhesion to metals, include maleic anhydride, methacrylic anhydride, and glycidyl methacrylate.

Component (x) can be an unsaturated or epoxy-functional compound. Suitable epoxy-functional compounds are known in the art and commercially available, see for example, U.S. Pat. Nos. 4,087,585; 5,194,649; 5,248,715; and 5,744,507 (at col. 4-5). Component (g) may comprise an unsaturated or epoxy-functional alkoxysilane. For example, the functional alkoxysilane can have the formula $R^7_v Si(OR^8)_{(4-v)}$, where subscript v is 1, 2, or 3, alternatively v is 1.

Each $R^7$ is independently a monovalent organic group with the proviso that at least one $R^7$ is an unsaturated organic group or an epoxy-functional organic group. Epoxy-functional organic groups for $R^7$ are exemplified by 3-glycidoxypropyl and (epoxycyclohexyl)ethyl. Unsaturated organic groups for $R^7$ are exemplified by 3-methacryloyloxypropyl, 3-acryloyloxypropyl, and unsaturated monovalent hydrocarbon groups such as vinyl, allyl, hexenyl, undecylenyl.

Each $R^8$ is independently an unsubstituted, saturated hydrocarbon group of 1 to 4 carbon atoms, alternatively 1 to 2 carbon atoms. $R^8$ is exemplified by methyl, ethyl, propyl, and butyl.

Examples of suitable epoxy-functional alkoxysilanes include 3-glycidoxypropyltrimethoxysilane, 3-glycidoxypropyltriethoxysilane, (epoxycyclohexyl)ethyldimethoxysilane, (epoxycyclohexyl)ethyldiethoxysilane and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof. Alternatively, examples of suitable adhesion promoters include glycidoxypropyltrimethoxysilane and a combination of glycidoxypropyltrimethoxysilane with an aluminum chelate or zirconium chelate.

Component (x) may comprise an epoxy-functional siloxane such as a reaction product of a hydroxy-terminated polyorganosiloxane with an epoxy-functional alkoxysilane, as described above, or a physical blend of the hydroxy-terminated polyorganosiloxane with the epoxy-functional alkoxysilane. Component (x) may comprise a combination of an epoxy-functional alkoxysilane and an epoxy-functional siloxane. For example, component (x) is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer. When used as a physical blend rather than as a reaction product, these components may be stored separately in multiple-part kits.

Suitable mercapto-functional compounds include an organomercaptan, a mercapto containing silane, or a combination thereof. Suitable mercapto containing silanes include 3-mercaptopropyltrimethoxysilane. Suitable mercapto-functional compounds are disclosed in U.S. Pat. No. 4,962,076. One skilled in the art would recognize that certain components described herein may be added to the composition for more than one or different purposes. For example, alkoxysilanes may be use as adhesion promoters, filler treating agents, and/or as crosslinking agents in condensation reaction curable silicone compositions.

The reactive resin may be formed by one of two methods

In the first method, the so-called sequential addition method, the resin (i) and endcapper (iii) and alkenyl-functional polyorganosiloxane (iv) are premixed to homogeneity, wherein the hydrosilylation catalyst (v) is added and the product is mixed again to homogeneity, wherein the catalyst (v) begins to catalyze the reaction of the resin (i) and endcapper (iii). The temperature is raised to temperature sufficient to achieve reaction of the resin (i) and endcapper (iii), such as to between 35° C. and 80° C., such as 40° C. Next, the alkoxy-functional organosiloxane compound (ii) is added and the mixture is allowed to continue to react at a maximum of 80° C. for a predetermined period of time, such as 30 minutes. At this point, the product was stripped at full vacuum at a temperature sufficient to remove any excess endcapper (iii), such as at 140° C. for 30 minutes.

In the second method, or all-in-one method, the resin (i) and alkoxy-functional organosiloxane compound (ii) and endcapper (iii) and alkenyl-functional polyorganosiloxane (iv) are premixed to homogeneity, at which point the hydrosilylation catalyst (v) is added and the product is mixed again to homogeneity wherein the catalyst (v) begins to catalyze the reaction of the resin (i) and endcapper (iii). The temperature is raised to temperature sufficient to achieve reaction of the resin (i) and endcapper (iii), such as to between 35° C. and 80° C., such as 40° C. At this point, the product was stripped at full vacuum at a temperature sufficient to remove any excess endcapper (iii), such as at 140° C. for 30 minutes.

The alkoxy-functional organopolysiloxane resin and polymer of the present invention may be utilized in a wide variety of silicone adhesive applications. The alkoxy-functional organopolysiloxane polymer and resin aids in the dispensability of these adhesives, and also provides reactive functionality that is capable of moisture cure.

Comparative Examples

These examples are intended to illustrate the invention to one of ordinary skill in the art and should not be interpreted as limiting the scope of the invention set forth in the claims. The following components were used in the examples described below.

NMR:

Solution-state $^{29}$Si- and $^{13}$C-NMR spectra were recorded on a Mercury VX 400 MHz spectrometer at room temperature (20-22° C.) using CDCl3 (Isotec) in a 16 mm Si-free probe. Cr(acac)$_3$ (Chromium acetylacetonate) (20 mM) was added to NMR samples as a relaxation agent. $^{29}$Si NMR spectra were acquired at 79.493 MHz and processed with 5 Hz of Lorentzian line broadening. The spectra were only semiquantitative due to the long relaxation times of the $^{29}$Si nucleus, but relative comparison of spectra acquired under identical conditions was considered quantitative. $^{13}$C NMR spectra were acquired at 100.626 MHz and processed with 3 Hz of Lorentzian line broadening. For both nuclei, 256-512 scans with a 90° pulse width were typically co-added to achieve adequate sensitivity; a 6-second ($^{29}$Si) or 12-second (13C) delay between pulses was used. Gated decoupling was used to remove negative nuclear Overhauser effects. Chemical shifts were referenced to external tetramethylsilane (TMS).

I. List of Components for Examples:

DOW CORNING® SFD-120; 0.13 wt % vinyl linear polydimethylsiloxane;

DOW CORNING® SFD-128; 0.088 wt % vinyl linear polydimethylsiloxane;

Methylhydrogensiloxane; 1.67 wt % SiH methylhydrogen silicone cyclic;

DOW CORNING® 2-0707; Platinum catalyst 0.52 wt % Platinum;

MB2030—(DOW CORNING® SFD-128/silica blend);

Methyltrimethoxysilane (MTM); DOW CORNING® Z6070;

OFS-1579/ETS900—Mixture of methyl and ethyltriacetoxysilane;

Hexamethyldisilazane (DOW CORNING® 4-2839);

Tetramethyldivinyldisilazane; (DOW CORNING® Z-2484);

(DOW CORNING® XCF3-6105)—Trimethoxysilylethyl-1,1,3,3-tetramethyldisiloxane (ETM);
DOW CORNING® 2-5161 Capper Heptamethyltrisiloxane;
OFS-6030 SILANE Methacryloxypropyltrimethoxysilane;
OFS-2306 SILANE Isobutyltrimethoxysilane (IBTMS);
Alkoxylated Polymer 1 (AP-1)—DOW CORNING® 3-0116 Trimethoxysilylethyl)tetramethyldisiloxane-terminated polydimethylsiloxane (DOW CORNING® SFD 128), about 60,000 cps;
Alkoxylated Polymer 2 (AP-2)—Trimethoxysilylethyl)tetramethyldisiloxane terminated polydimethylsiloxane (DOW CORNING® SFD-120) about 10,000 cps;
Alkoxylated Polymer 3 (AP-3) DOW CORNING® 3-1717 Trimethoxysilylethyl)tetramethyldisiloxane terminated polydimethylsiloxane (DOW CORNING® SFD-117), about 2000 cps;
Alkoxylated Polymer 4 (AP-4) DOW CORNING® 3-1719 Trimethoxysilylethyl)tetramethyldisiloxane-terminated polydimethylsiloxane, about 500 cps;
DOW CORNING® 866 is a 1-part platinum addition-cured adhesive;
DOW CORNING® 3-6265 is a 1-part platinum addition-cured adhesive;
DOW CORNING® 3-6265 HP is a 1 part platinum addition-cured adhesive;
MQ resin 1 (DC407 resin) high silanol $M_w$ 17,000-22000 g/mol, silanol content 3.4 wt %, available from Dow Corning Corporation of Midland, Mich., USA;
ViMQ resin 1 high vinyl high silanol MQ (6-3444), vinyl content 1.9 wt %, $M_w$=17,000-22000 g/mol, silanol content 1.5 wt %, available from Dow Corning Corporation of Midland, Mich., USA;
ViMQ resin 2 High Vinyl low silanol MQ (DOW CORNING® PL3444) vinyl content 1.9 wt %, $M_w$=17,000-22000 g/mol, silanol content 0.3-1.0 wt %, available from Dow Corning Corporation of Midland, Mich., USA;
Diallyl Maleate (DAM) available from Bimax Inc. of Glen Rock, Pa.;
Allyl methacrylate (AMA) available from BASF Corporation of Florham Park, N.J.;
Butylated Hydroxy Toluene (BHT) available from Sigma Aldrich of Milwaukee, Wis.;
Magnesium oxide (MAGOX SUPER PREMIUM); available from Premier Magnesia, W. Conshohocken, Pa. 19428 USA;
BA33 Iron Oxide pigment; available from Cathay Pigments (USA), Inc. Valparaiso, Ind. 46383 USA;
Varox® DCBP-50 Paste; available from R T Vanderbilt Co., Norwalk Conn. 06856 USA;
Perkadox L-50-PS; a product of Akzo Nobel Polymer LLC, Chicago Ill. USA;
TAIC; triallylisocyanurate from Sigma-Aldrich Corp. St. Louis, Mo., USA;
TYZOR TNBT; available from Dorf Ketal Speciality Catalysts, LLC, 3727 Greenbriar Dr., Stafford, Tex. 77477 USA;
A-1110 is Silquest A1110, available from Momentive Performance Materials Inc, Albany N.Y. USA;
A-186 is Silquest A186, available from Momentive Performance Materials Inc, Albany N.Y. USA;
TINOPAL OB, Optical brightener from BASF Corporation 100 Campus Drive Florham Park, N.J. 07932. USA;
2-Mercaptobenzothiazole; available from Sigma-Aldrich Corp. St. Louis, Mo., USA;
Trifluoroacetic acid (TFAA), available from Sigma-Aldrich Corp. St. Louis, Mo., USA;
Trifluoromethanesulfonic acid, triflic acid (FC-24), available from 3M Corporation, St. Paul, Minn. 55144-1000 USA;

II. List of Substrates for Examples:

Alclad™ Aluminum Type AD Q-Panel 2024T3: available from Q-Lab Corporation, 800 Canterbury Rd., Cleveland, Ohio 44145 USA;

III. Equipment Used for Examples:

All blending described below was done with a Pneumatic High Shear Mixer fed with a Pneumatic pail pump and metered with a Zenith 2.92 CC/Rev Gear Pump. Catalyst feed was carried out by an Isco 500D Syringe pump.

All extrusion experiments were performed on a modular 30 mm Co-Rotating, Fully Intermeshing Twin Screw Extruder manufactured by Century. The extruder is powered by a 15HP AC motor capable of generating screw speeds of up to 500 rpm. The actual diameter of each screw is 30.7 mm and the channel depth is 4.8 mm. The free space cross sectional area is 4.77 cm². The overall length to diameter ratio of the machine is 42:1 L/D (12 barrels) having a total free processing volume of 477 cm³. The screw elements that were utilized consisted of right and left handed conveying screws and kneading blocks.

IV. Evaluation of Adhesive Compositions Including Alkoxylated Resin Polymer Blend for Viscosity A. Synthesis of Alkoxylated Resin Polymer Blend (ARPB)

The alkoxylated resin polymer blend (ARPB) was made by one of 2 methods, 1) separate discrete additions of the alkoxylating agent followed by the monohydrido silicone endcapping agent (i.e., the endcapper) to a resin polymer blend (RPB), or the more preferred all-in-one consecutive addition of the alkoxylating agent and endcapping agent to a RPB.

Sample A was prepared by first mixing components 1 and 3 (see Table 1 below) for 10 minutes. The reaction was catalyzed by the addition of component 2. Components 1-3 were then allowed to react at 40° C. for 30 minutes, at which point component 4 was added and the mixture was allowed to co continue to react at a maximum of 80° C. for 30 minutes. At this point, the product was stripped at full vacuum at 140° C. for 30 minutes.

Samples B, C & D were prepared by mixing components 1, 3, and 4 well for 10 minutes and then adding component 2 and mixing the product for 10 minutes. The product was then heated for 10 minutes at 40° C. The temperature was then increased to 76° C. and held for 30 minutes. At this point, the product was stripped at full vacuum at 140° C. for 30 minutes. The compositions of Samples A-D are summarized in Table 1:

TABLE 1

| Component # | Sample A | Sample B | Sample C | Sample D |
| --- | --- | --- | --- | --- |
| 1. Resin Polymer Blend RPB[1] | 88.8 | 88.8 | 89 | 89 |
| 2. Platinum catalyst[2] | 0.15 | 0.15 | 0.15 | 0.15 |
| 3. ETM[3] | 6.2 | 6.2 | 5.5 | 5 |
| 4. Endcapper[4] | 5 | 5 | 5.5 | 6 |

TABLE 1-continued

|  | Sample A | Sample B | Sample C | Sample D |
|---|---|---|---|---|
| Composition Properties | | | | |
| SiH:Vi ratio ETM | 0.6 | 0.6 | 0.53 | 0.48 |
| SiH:Vi ratio Endcapper | 0.64 | 0.64 | 0.7 | 0.76 |
| Total SiH:Vi ratio | 1.24 | 1.24 | 1.23 | 1.24 |

[1] Physical mixture of DOW CORNING ® SFD-120 (vinyl endblocked PDMS polymer) and vinylated MQ resin (DOW CORNING ® 6-3444)) at 45:55 Resin to polymer ratio. 6-3444 is approx 1.9 wt % vinyl with 1.8 wt % silanol as confirmed by $^{29}$Si-NMR.
[2] DOW CORNING ® 2-0707.
[3] DOW CORNING ® XCF3-6105.
[4] DOW CORNING ® 2-5161.

B. Evaluation of Adhesive Compositions including Samples A-D for Viscosity

The alkoxylated resin polymer blends (Samples A-D) were then mixed with a non-reactive masterbatch of silicone fluid and filler (MB2030) to simulate the viscosity of the intended adhesive application. The respective viscosities of the resultant adhesive compositions were measured on a Brookfield viscometer (HAT) with a #7 spindle.

To measure the viscosities, the spindles were inserted to the correct level with the adhesive sample. The spindle was then rotated at 50 revolutions per minute (rpm) for 1 minute, followed by rotation at 100 rpm for 1 minute, followed by rotation at 10 rpm for two minutes, wherein the adhesive samples were read for viscosity. The samples were then rotated at 1 rpm and read for viscosity at 2 minutes. The thixotropy ratio was determined by dividing the viscosity reading at the 1 rpm value by the reading at the 10 rpm value. The results are summarized in Table 2:

TABLE 2

| | | MB/ARPB Ratio | Process | SIH/Vi ratio ETM | Viscosity (cps) 1 rpm | Viscosity (cps) 10 rpm | Thixotropy Ratio |
|---|---|---|---|---|---|---|---|
| AA | Filler MB2030 with Sample A control | 80:20 | Sequential | 0.6 | 2,784,000 | 512,000 | 5.44 |
| BB | Filler MB2030 with Sample B control | 80:20 | All in one | 0.6 | 2,696,000 | 500,000 | 5.39 |
| CC | Filler MB2030 with Sample C | 80:20 | All in one | 0.53 | 2,608,000 | 492,000 | 5.30 |
| DD | Filler MB2030 with Sample D | 80:20 | All in one | 0.48 | 2,440,000 | 480,000 | 5.08 |

The results of Table 2 confirm that adhesive compositions prepared from alkoxy-functional siloxane reactive resins made by either sequential addition or by an all in one type addition (Comparative Samples AA and BB) exhibited similar viscosity profiles.

Further, the reduction in the amount of alkoxylating agent in the alkoxylated resin polymer blend while increasing the amount of endcapper (Comparing Samples CC and DD to BB), while maintaining the overall SiH/Vi ratio in the APRB, resulted in a slight decrease in the viscosity of the adhesive compositions to which they are introduced and a corresponding reduction in the thixotropy index.

V. Evaluation of Adhesive Compositions

A. Preparation of Methacrylate Clustered Silicone Polymers (MCP-1 and MCP).

In a 50 liter Turello mixer 12 kg of a silicone polymer masterbatch (MB2030) (SFD-128/silica blend), 6.77 kg of SFD120 polymer, 1.12 kg of OS20 silicone fluid (methylsiloxane fluid available from Dow Corning Corporation of Midland, Mich.) and 20.45 g of OFS-1579 isomer reducing agent were loaded. The mixture was inerted using 2% oxygen in nitrogen atmosphere and stirred for 15 minutes. To this homogenized mixture was added 6 g of BHT, 409.7 g of cyclic methylhydrogensiloxane, and 965.3 g of AMA. The resultant mixture was stirred for an additional 20 minutes at room temperature, at which point 26.62 g of a platinum catalyst was added and the mixture. The mixture was stirred for 10 additional minutes before setting the temperature at 60° C. The temperature was held for 30 minutes at 60° C. before cooling to greater than 40° C. and adding 26.62 g of DAM. The mixture was then cooled to less than 35° C. before adding 182.8 g of methyltrimethoxysilane (MTM). The mixture was then heated to 60° C. and held for 30 minutes, wherein the temperature was increased to 80° C. and a vacuum of 55 mm Hg was applied for 40 minutes. The resultant polymer is hereinafter referred to as MCP-1.

To form the polymer MCP, the same procedure as the previous paragraph was followed, with the exception of the addition of the isomer reducing agent.

B. Preparation of RPB HS and RPB LS.

Resin polymer blends (RPB HS and RPB LS) in examples below were prepared by the slow addition of 45 parts of Dow Corning® SFD-120 polymer (with stirring) to 55 parts of a vinyl MQ resin (either ViMQ Resin 1 or ViMQ Resin 2) in xylene. The homogeneous solution was devolatized at 150° C. under a 2 mm Hg vacuum on a rotary evaporator to form the respective resin polymer blend (RPB HS, made ViMQ Resin 1; or RPB LS, made ViMQ Resin 2).

Next, 669.7 grams of RPB HS or LS were blended into a ¼ quart Ross mixer with 28.3 grams of Component 3 and 8.1 grams of Component 4. 7.55 grams of Component 5 and 0.76 grams of Component 6 were optionally added to this mixture and mixed for 15 minutes. The treating blend of Components 5 and 6 were then added to the mixture, and the mixture was blended for 15 minutes and then heated to 60° C. for 30 minutes. Finally, the heat was increased to 120° C. and the mixture was placed under vacuum. The resultant compositions, shown in Table 3, were labeled ARPB-E, ARPB-F, and ARPB-G, respectively.

TABLE 3

| | Component # | ARPB-E | ARPB-F | ARPB-G |
|---|---|---|---|---|
| RPB HS | 1 | — | — | 669.7 |
| RPB LS | 2 | 669.7 | 669.7 | — |
| MgO | 3 | 28.3 | 28.3 | 28.3 |
| BA33 Black Pigment | 4 | 8.1 | 8.1 | 8.1 |
| Dow Corning Z6070 (methyltrimethoxysilane) | 5 | 7.55 | 0.00 | 7.55 |
| Dow Corning 4-2839 (Hexamethyldisilazane) | 6 | 0.76 | 0.00 | 0.76 |
| ETM | 7 | 47.1 | 47.1 | 47.1 |
| Capper | 8 | 37.7 | 37.7 | 37.7 |
| Catalyst | 9 | 0.75 | 0.75 | 0.75 |

C. Preparation of Thermal Radical Cure Silicone Adhesive Compositions for Evaluation In a 1 quart Ross mixer, the following components were mixed with cooling to maintain a temperature of 25° C. or less to form adhesive compositions, as shown in Table 4.

TABLE 4

| MCP-1 | 71.75 |
|---|---|
| ARBP(E, F or G) | 19.34 |
| RBM-9020 MODIFIER | 2.95 |
| OFS-6030 SILANE | 1.97 |
| TAIC | 0.49 |
| TYZOR TNBT | 0.62 |
| A-1110 | 0.1 |
| A186 | 0.6 |
| MBT | 0.15 |
| OFS-2306 SILANE | 1.96 |
| OFS-1719 SILANE | 0.1 |
| TINOPAL OB | 0.02 |

Next, the viscosity of the adhesives formed from Table 4, and listed below in Table 5, were monitored at 2 shear rates (0.1 and 1 sec$^{-1}$) using an Ares parallel plate rheometer (Ares Rheometer model G2 from TA instruments, 159 Lukens Drive, New Castle, Del. 19720) as a function of days aged at room temperature. The results are summarized in Tables 5 and 6:

TABLE 5

(0.1 sec$^{-1}$ shear rate)

| | Days Aged | | | | | |
|---|---|---|---|---|---|---|
| | 1 | 7 | 14 | 21 | 23 | 30 |
| Material | Aries (0.1 sec−1) | | | | | |
| MCP-1 + ARPB-E | 1962.7 | 2664.6 | 2987 | 3056.5 | NA | 3406.6 |
| MCP-1 + ARPB-F | 1610.2 | 1872.9 | 1921.6 | NA | 2257 | 2231.1 |
| MCP-1 + ARPB-G | 2988.3 | 4258.7 | 4429.7 | NA | 4897 | 5611.9 |

TABLE 6

(1 sec$^{-1}$ shear rate)

| | Days Aged | | | | | |
|---|---|---|---|---|---|---|
| | 1 | 7 | 14 | 21 | 23 | 30 |
| | Aries (1 sec−1) | | | | | |
| MCP-1 + ARPB-E | 324.24 | 430.46 | 486.94 | 492.57 | NA | 445.77 |
| MCP-1 + ARPB-F | 297.61 | 330.96 | 374.88 | NA | 432.53 | 434.94 |
| MCP-1 + ARPB-G | 434.18 | 584.4 | 656.42 | NA | 759.7 | 610.51 |

As Tables 5 and 6 confirm, the low silanol versions of ARPB (ARPB-E and F) provided reduced viscosity as compared with the higher silanol version of ARPB (ARPB-G).

Next, the adhesives were applied to Alclad™ aluminum substrates (available from Alcoa) and cured for 20 minutes at 85° C. and having 8 mil bond line thickness. One half of the samples were evaluated at room temperature and aged, while the remaining samples were placed in a pressure cooker tester (PCT) for 24 hours at 1 additional atmosphere and evaluated after aging. The lap shear adhesive properties of the coated substrates appropriately aged were evaluated for peak stress, in pounds per square inch (PSI), with the results summarized in Table 7.

TABLE 7

| | Peak Stress (PSI) | | | |
|---|---|---|---|---|
| | Dry Adhesion | | PCT | |
| | Initial | Week2 | Week1 | Week2 |
| Table 3 Adhesive with MCP | 431.16 | 400.51 | 513.01 | 527.18 |
| Table 3 Adhesive with MCP-1 | 495.94 | 424.66 | 563.12 | 533.39 |

As Table 7 confirms, the introduction of an isomer reducing agent to the adhesive composition resulted in comparable adhesion to Alclad™ aluminum substrates as compared with samples that did not include the isomer reducing agent.

D. Evaluation of Dispensing Properties for Thermal Radical Cure Silicone Adhesive Compositions Next, the dispensing properties of various thermal radical cure compositions were evaluated.

The materials in Table 8 were cold blended in a Hauschild Speedmixer DAC 150.1 FV-K available from FlackTek Inc, Landrum, S.C. 29356 USA.

TABLE 8

| RBM-9020 MODIFIER[1] | 32.22 |
|---|---|
| OFS-6030 Silane[2] | 21.99 |
| TAIC[3] | 5.47 |
| TYZOR TNBT[4] | 6.92 |
| A-1110[5] | 1.12 |
| A186[6] | 6.70 |
| 2-Mercaptobenzothiazole[7] | 1.67 |
| OFS-2306 Silane[8] | 21.88 |
| OFS-1719 Silane[9] | 1.12 |
| TINOPAL OB[10] | 0.22 |

The components in Table 9 were also mixed in the speedmixer prior to evaluation for dispensability.

TABLE 9

| Components | MCP | MCP+ | MCP + SFD-120 | MCP-1 + AP3[12] | MCP + ARPB-1 |
|---|---|---|---|---|---|
| MCP-1 | 72 | 92 | 72 | 72 | 72 |
| SFD-120 | — | — | 20 | — | — |
| AP3[12] | — | — | — | 20 | — |
| ARPB-1 | — | — | — | — | 20 |
| Table 12 mixture | 8 | 8 | 8 | 8 | 8 |
| TOTAL | 80 | 100 | 100 | 100 | 100 |

TABLE 9-continued

| Components | MCP | MCP+ | MCP + SFD-120 | MCP-1 + AP3[12] | MCP + ARPB-1 |
|---|---|---|---|---|---|
| Dispense Rating (5 = best) | 1 | 1 | 1 | 1 | 4 |

[12]AP3- DOW CORNING ® 3-1717 - Trimethoxysilylethyl)tetramethyldisiloxane-terminated polydimethylsiloxane (DOW CORNING ® SFD-117), about 2000 cps.

Dispense and stringing checks were done using an EFD 1000-XL syringe dispenser (Available from Nordson EFD, East Providence, R.I. 02914 USA. Materials being compared were dispensed from 30 ml EFD syringes at 50 pounds per square inch of air pressure.

The rating is a subjective rating based on the ability to control the adhesive bead at an applied pressure. The rating is a reflection of the tendency and length of any bead on termination of applied pressure. Even with superior cure and adhesion to multiple substrates, the inability to routinely dispense a bead or dot of adhesive on a substrate, in a timely manner, can stop commercial adoption.

As Table 9 confirms, the ARPB-1 defined above improves dispensing without loss of mechanical properties. It also provides a secondary cure mechanism by which any surface tack in the radical cured system due to oxygen inhibition can be overcome. It should also be noted that the alkoxy functionality is highly desirable for adhesion to mineral and metallic surfaces.

E. Evaluation of Mechanical Properties for Thermal Radical Cure Silicone Adhesive Compositions 1"×3" panels of the various substrates were cleaned with acetone (3 samples prepared). Bondlines were established using Spheriglass spacer beads (Potters Industries Inc. 350 North Baker Drive, Canby, Oreg. 97013-0607) appropriate with the application (i.e., 8 mil (200 micron)). Larger bond lines used 20 mil wire.

A ⅜" binder clip was used with both spacers methods to secure substrates during cure. Cure at time and temperature were specified in results below. Testing was carried out on Instron 5566 tensiometer at 2 inches per minute (Instron Worldwide Headquarters, 825 University Ave., Norwood, Mass. 02062-2643).

TABLE 10

|  | DOW CORNING ® 866 | | DOW CORNING ® 3-6265 | | DOW CORNING ® 3-6265 HP | | Table 3 Adhesive with MCP-1 | |
|---|---|---|---|---|---|---|---|---|
|  | PSI | % CF | PSI | % CF | PSI | % CF | PSI | % CF |
| Alclad ™ Al[11] (Peel) | 12 | 10% | 20 | 100% | 20 | 20% | 40 | 100% |
| 3105 PBT[12] (lap shear) | 538 | 100 | 476 | 100 | 617 | 100 | 300 | 100% |
| 3105 PBT (peel) | 18 | 70 | 16 | 100 | 16 | 100 | 50 | 100% |
| LCP[13] (lap shear) | 107 | 0 | 0 | 0 | 100 | 0 | 290 | 100% |
| PA66[14] (peel) | 16 | 90 | 12 | 100 | 10 | 50 | 34 | 100% |
| PC[15] (peel) | 0 | 0 | 0 | 0 | 0 | 0 | 95 | 100% |
| PE[16] (peel) | 0 | 0 | 0 | 0 | 0 | 0 | 12 | 50% |
| FR-4[17] (lap shear) | 355 | 100 | 477 | 100 | 658 | 100 | 308 | 100% |
| FR-4 (peel) | 12 | 100 | 20 | 100 | 22 | 100 | 44 | 100% |

[11]Alclad Aluminum, Type AD Q-Panel 2024T3 from Q-Lab Corporation, 800., Cleveland, OH 44145 USA.
[12]3105 PBT: Polybutylene terephthalate Celanex ® 3105 available from Ticona North America, Florence, KY 41042.
[13]LCP: liquid crystal polymer, Xydar ® available from Solvay Chemicals, Houston, Texas 77098 USA.
[14]PA66: Polyamide Ultramid ® available at BASF Corpration, Florham Park, NJ 07932 USA.
[15]PC: Polycarbonate Lexan ® available from, SABIC Innovative Plastics Pittsfield, MA 01201, USA.
[16]PE: Polyethylene Medium High Density PE (PEX), available at Lowes, Mooresville, NC 28117 USA
[17]FR-4: Epoxy glass fiber laminates available from Norplex-Micarta, Postville, Iowa, USA.

As Table 10 illustrates, the adhesive composition (Table 3 Adhesive with MCP-1) according to the present invention exhibited adequate adhesion and cohesion to both aluminum and plastic substrates and was the only adhesive composition to adhere to polyethylene. The instant disclosure has been described in an illustrative manner, and it is to be understood that the terminology which has been used is intended to be in the nature of words of description rather than of limitation. Obviously, many modifications and variations of the instant disclosure are possible in light of the above teachings. It is, therefore, to be understood that within the scope of the appended claims, the instant disclosure may be practiced otherwise than as specifically described.

The invention claimed is:

1. A flowable alkoxy-functional organopolysiloxane resin and polymer comprising a reaction product of a reaction consisting essentially of:
   (i) an alkenyl-functional siloxane resin comprising $R_3SiO_{1/2}$ units and $SiO_{4/2}$ units,
   wherein each R is independently a monovalent hydrocarbon radical having 1 to 6 carbon atoms with the proviso that at least one R is an alkenyl radical,
   wherein the molar ratio of the $R_3SiO_{1/2}$ units to $SiO_{4/2}$ units has a value ranging from 0.5/1 to 1.5/1,
   (ii) an alkoxysilane-functional organosiloxane compound having at least one silicon-bonded hydrogen atom at a molecular terminal;
   (iii) an endcapper according to the formula $R^2_3SiO$—$(R^2_2SiO)_s$—$SiR^2_2H$ or $R^2_3SiO$—$(R^2_2SiO)_t$—$(HR^2SiO)$—$SiR^2_3$, or combinations thereof, wherein each $R^2$ is independently a hydrocarbon radical and wherein the subscripts s and t have respective values ranging from 0 to 10; and
  (iv) a polyorganosiloxane having an average, per molecule, of at least 2 aliphatically unsaturated organic groups;
in the presence of a (v) hydrosilylation catalyst.

2. The alkoxy-functional organopolysiloxane resin and polymer according to claim 1, wherein the silanol content of the resin (i) is less than 1 weight percent of the total weight of the resin (i).

3. The alkoxy-functional organopolysiloxane resin and polymer according to claim 1, wherein the resin (i) has a weight average molecular weight ranging from 12,000 to 30,000 g/mole (Daltons).

4. The alkoxy-functional organopolysiloxane resin and polymer according to claim 1, wherein the resin (i) has a weight average molecular weight ranging from 17,000 to 22,000 g/mole (Daltons).

5. The alkoxy-functional organopolysiloxane resin and polymer according to claim 1, wherein the alkoxysilane-functional organosiloxane compound (ii) is of the formula $HSi(R^3)_2OSi(R^3)_2CH_2CH_2SiR^3_z(OR^3)_{3-z}$, wherein each $R^3$ is independently a monovalent hydrocarbon having 1 to 6 carbon atoms and wherein the subscript z is 0 or 1.

6. The alkoxy-functional organopolysiloxane resin and polymer according to claim 5, wherein $R^2$ is methyl.

7. The alkoxy-functional organopolysiloxane resin and polymer according to claim 1, wherein at most 60 weight % of the alkenyl radicals of the resin (i) react with the silicon-bonded hydrogen atoms of component (ii).

8. The alkoxy-functional organopolysiloxane resin and polymer according to claim 1, wherein at least 40 weight % of the alkenyl radicals of the resin (i) react with the silicon-bonded hydrogen atoms of component (iii).

9. The alkoxy-functional organopolysiloxane resin and polymer according to claim 1, wherein the polyorganosiloxane (iv) is according to the Formula (I) $R^4_2R^5SiO(R^4_2SiO)_a(R^4R^5SiO)_bSiR^4_2R^5$ or according to the Formula (II) $R^4_3SiO(R^4_2SiO)_c(R^4R^5SiO)_dSiR^4_3$, or a combination thereof, wherein each $R^4$ is independently a monovalent organic group free of aliphatic unsaturation, each $R^5$ is independently an aliphatically unsaturated organic group, subscript a has an average value ranging from 2 to 1000, subscript b has an average value ranging from 0 to 1000, subscript c has an average value ranging from 0 to 1000, and subscript d has an average value ranging from 4 to 1000, and wherein $10 \le (a+b) \le 1000$ and $10 \le (c+d) \le 1000$.

10. The alkoxy-functional organopolysiloxane resin and polymer according to claim 1, wherein the alkenyl content of the alkoxy-functional organopolysiloxane resin and polymer comprises from 0.6 to 2.2 weight percent of the total weight of the alkoxy-functional organopolysiloxane resin and polymer.

11. The alkoxy-functional organopolysiloxane resin and according to claim 1, wherein the silanol content of the alkoxy-functional organopolysiloxane resin and polymer comprises from 0.3 to 2.2 weight percent of the total weight of the alkoxy-functional organopolysiloxane resin and polymer.

12. The alkoxy-functional organopolysiloxane resin and polymer according to claim 1, wherein the alkoxy-functional organopolysiloxane resin and polymer further comprises at least one additional component selected from an acid scavenger, a colorant, a resin treatment agent, a corrosion inhibitor, an adhesion promoter, and any combinations thereof.

13. The alkoxy-functional organopolysiloxane resin and polymer according to claim 12, wherein the at least one resin treatment agent comprises $R^6Si(OR^6)_3$, $(R^6_3Si)_2NH$, and combinations thereof, wherein each $R^6$ is independently a monovalent hydrocarbon radical having 1 to 6 carbon atoms.

14. A method for forming a flowable alkoxy-functional organopolysiloxane resin and polymer comprising:
  (1) concurrently reacting components consisting essentially of:
    (i) an alkenyl-functional siloxane resin comprising $R_3SiO_{1/2}$ units and $SiO_{4/2}$ units,
      wherein each R is independently a monovalent hydrocarbon radical having 1 to 6 carbon atoms with the proviso that at least one R is an alkenyl radical,
      wherein the molar ratio of the $R_3SiO_{1/2}$ units to $SiO_{4/2}$ units has a value of from 0.5/1 to 1.5/1,
    (ii) an alkoxysilane-functional organosiloxane compound having at least one silicon-bonded hydrogen atom at a molecular terminal,
    (iii) an endcapper according to the formula $R^2_3SiO$—$(R^2_2SiO)_s$—$SiR^2_2H$ or $R^2_3SiO$—$(R^2_2SiO)_t$—$(HR^2SiO)$—$SiR^2_3$, or combinations thereof, wherein each $R^2$ is independently a hydrocarbon radical and wherein the subscripts s and t have respective values ranging from 0 to 10,
    (iv) a polyorganosiloxane having an average, per molecule, of at least 2 aliphatically unsaturated organic groups; and
    (v) hydrosilylation catalyst to give a reaction product of step (1); and
  (2) stripping the reaction product of step (1) under vacuum to remove any excess endcapper (iii) to form the alkoxy-functional organopolysiloxane resin and polymer.

15. A method for forming an alkoxy-functional organopolysiloxane resin and polymer comprising;
  (1) concurrently reacting components consisting essentially of:
    (i) an alkenyl-functional siloxane resin comprising $R_3SiO_{1/2}$ units and $SiO_{4/2}$ units, wherein each R is independently a monovalent hydrocarbon radical having 1 to 6 carbon atoms with the proviso that at least one R is an alkenyl radical and wherein the molar ratio of the $R_3SiO_{1/2}$ units to $SiO_{4/2}$ units has a value of from 0.5/1 to 1.5/1,
    (iii) an endcapper according to the formula $R^2_3SiO$—$(R^2_2SiO)_s$—$SiR^2_2H$ or $R^2_3SiO$—$(R^2_2SiO)_t$—$(HR^2SiO)$—$SiR^2_3$, or combinations thereof, wherein each $R^2$ is independently a hydrocarbon radical and wherein the subscripts s and t independently have respective values ranging from 0 to 10,
    (iv) a polyorganosiloxane having an average, per molecule, of at least 2 aliphatically unsaturated organic groups, and
    (v) a hydrosilylation catalyst to give a reaction product; and
  (2) introducing (ii) an alkoxysilane-functional organosiloxane compound having at least one silicon-bonded hydrogen atom at a molecular terminal, to the reaction product of step (1) to give a product of step (2); and
  (3) stripping excess endcapper (iii) from the product of step (2) under vacuum to form the alkoxy-functional organopolysiloxane resin and polymer.

16. The method according to claim 14, wherein at most 60 weight % of the alkenyl radicals of the resin (i) react with the silicon-bonded hydrogen atoms of component (ii).

17. The method according to claim 14, wherein at least 40 weight % of the alkenyl radicals of the resin (i) react with the silicon-bonded hydrogen atoms of component (iii).

18. The method according to claim 14 further comprising introducing at least one additional component to the formed alkoxy-functional organopolysiloxane resin and polymer, the at least one additional component selected from an acid scavenger, a colorant, a resin treatment agent, a corrosion inhibitor, an adhesion promoter, and any combinations thereof.

* * * * *